United States Patent [19]

Turnbull

[11] 4,334,276

[45] Jun. 8, 1982

[54] DISC ECCENTRICITY MEASURING MEANS

[75] Inventor: David F. Turnbull, Glenrothes, Scotland

[73] Assignee: Burroughs Corporation, Detroit, Mich.

[21] Appl. No.: 168,851

[22] Filed: Jul. 10, 1980

[30] Foreign Application Priority Data

Jul. 19, 1979 [GB] United Kingdom ............... 7925196

[51] Int. Cl.³ .................... G06F 15/20; G11B 7/00
[52] U.S. Cl. ..................................... 364/561; 360/77; 369/58
[58] Field of Search .................. 364/561; 360/77; 369/43, 53, 58

[56] References Cited

U.S. PATENT DOCUMENTS

| | | | |
|---|---|---|---|
| 3,691,543 | 9/1972 | Mueller | 360/77 |
| 3,893,180 | 7/1975 | Braun et al. | 360/77 |
| 4,101,942 | 7/1978 | Jacques | 360/77 |
| 4,138,741 | 2/1979 | Hedlund et al. | 360/77 X |
| 4,164,075 | 8/1979 | Hunyar | 369/58 X |

Primary Examiner—Jerry Smith
Attorney, Agent, or Firm—David G. Rasmussen; Kevin R. Peterson

[57] ABSTRACT

A data storage file for use with removable media is provided with media bearing servo information indicative of its desired center of rotation. The data storage file is also provided with media locating apparatus, which prepositions the media within the data storage file prior to media rotation, and servo information decoding apparatus, which scrutinizes the servo information. As the media rotates, the servo information decoding apparatus monitors the position and behavior of the servo information on the media and so examines the distance between the actual and desired centers of rotation of the media. Should this distance prove unacceptably large, indication is given that the media should be reintroduced to the media locating apparatus before proper operation of the data storage file may take place.

8 Claims, 10 Drawing Figures

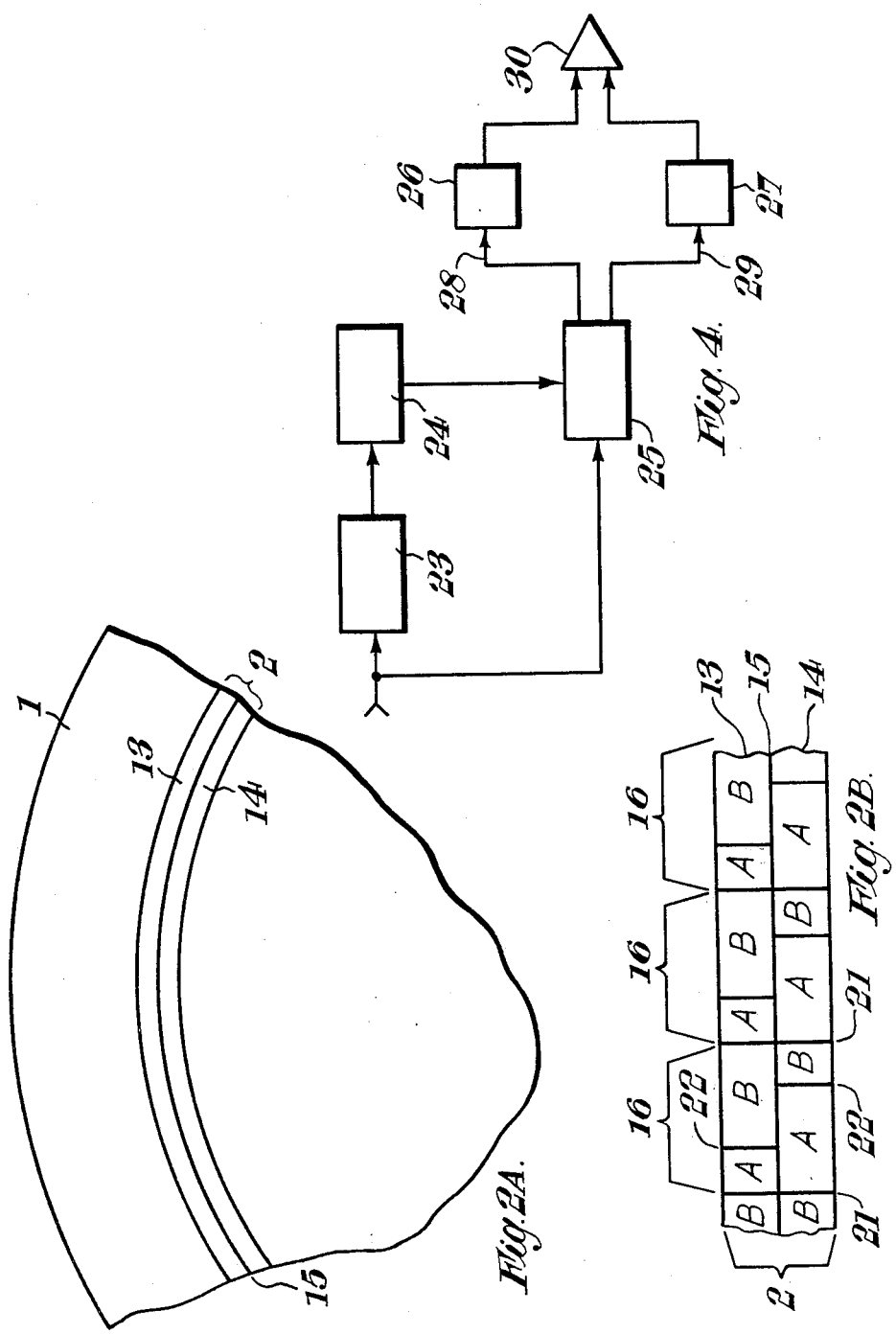

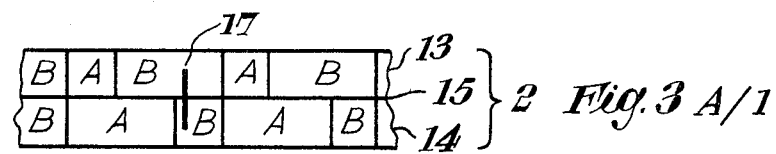
Fig. 3 A/1
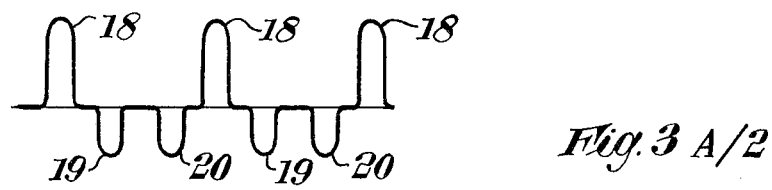
Fig. 3 A/2
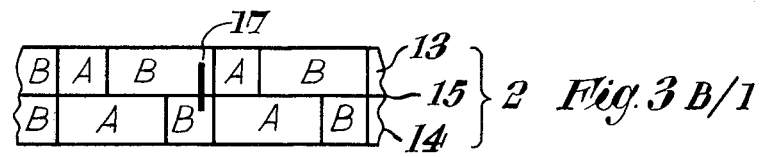
Fig. 3 B/1
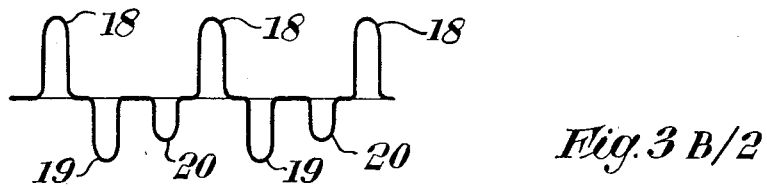
Fig. 3 B/2
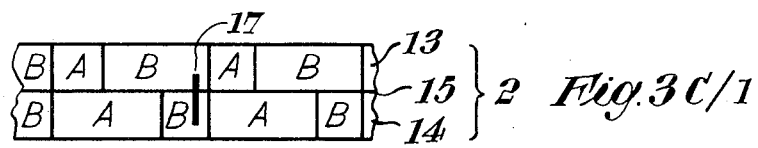
Fig. 3 C/1
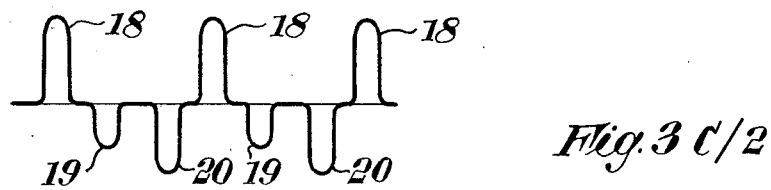
Fig. 3 C/2

DISC ECCENTRICITY MEASURING MEANS

FIELD OF THE INVENTION

This present invention relates to an apparatus for the storage of retrievable, informational data, on a plurality of concentric, data storage tracks on rotating, removable media.

In particular, it relates to an apparatus as described wherein there are provided means for examining the accuracy of the centring of the media within the apparatus, and for indicating an unacceptably erroneous centring of the media.

In greater particularity, the present invention relates to apparatus as described where there is provided on the media servo information indicative of the desired centre of rotation of the media, and where there is provided, in the apparatus, media locating means, prepositioning the media prior to its rotation, and servo information decoding apparatus, scrutinising the servo information on the media, such that, as the media rotates, the servo information decoding apparatus monitors the position and behaviour of the servo information on the media, so examining the distance between the actual and described centres of rotation of the media, and indication is given, should this distance prove unacceptably large, that the media requires to be reintroduced to the media locating apparatus before proper operation of the data storage file may proceed.

THE PRIOR ART

THE PROBLEMS OF DISC CENTRING

The problem of centring removable discs, which have been placed in a disc file, poses a limit on the radial density of concentric data storage tracks on the disc. A disc may be recorded in one machine with a first centre of rotation of the disc, and all of the concentric, data storage tracks so created will be concentric with that first centre of rotation. The recorded disc may happen then to be replayed, or rerecorded in part, by another machine which, because of manufacturing and disc locating tolerances, causes the disc to have a centre of rotation which is a little way removed from the centre of rotation in the first machine. This highlights the problem of interchangeability of discs between different machines of the same type and specification. A disc, having first been recorded on a particular machine, and then having been removed from and replaced back into the same machine, because of the tolerances mentioned above, may well be found to have a centre of rotation, on replacement, which is not coincident, relative to the disc, with the centre of rotation of the recording process. The concentric, data storage tracks on a disc for use in a disc file are intended to be circular, with centroid coincident with the centre of rotation of the disc. In this way, a transducer, placed over the disc at a particular radius, relative to the centre of rotation of the disc, so as to interact with a particular data storage track, and held, thereafter, in that fixed position, will have the track pass beneath it with no deviation of the track, relative to its situation beneath the transducer, either towards or away from the centre of rotation of the disc.

In the event of the centroid of the data track being removed a distance away from the centre of rotation of the disc, as is the case for a badly centred disc, the prerecorded track will execute a sinusoidal movement, relative to the transducer, in the direction of the centre of rotation of the disc, with period equal to the rotation time of the disc, and amplitude equal to the displacement between the data track centroid and the centre of rotation of the disc.

The sinusoidal movement of the data storage track beneath the transducer is a contributing factor in the mispositioning of the track relative to the transducer.

The allowable deviation of a data storage track from its nominal, undisplaced position of interaction with the transducer is an increasing function of track width and a decreasing function of radial track density. The greater the radial width of a track, the larger the distance it may be remote from its nominal position before a transducer in replaying mode encounters unacceptably low signal amplitudes due to the reduced fraction of the track with which it is interactive. The lower the track density, that is, the greater the radial spacing between tracks, the further away a transducer may be from the nominal track center before it begins to interact, either in recording or replaying mode, with tracks adjacent to that track with which it is intended to interact.

A disc replay with an excessive amount of displacement between the centroid of its data tracks and its center of rotation termed the eccentricity of the disc, runs a high risk of unreliable data recovery because of low amplitude encountered as the transducer interacts with a smaller fraction of the data track and also because of the unwanted pick up of interferring signals as the head interacts with tracks adjacent to the intended track.

A disc file, recording with excessive eccentricity, will lay down data storage tracks on the disc which will be potentially unusable to another machine having less eccentricity, so destroying the possibility of the interchangeability of discs between different machines. It also runs the risk of over-recording already recorded adjacent tracks, at least in part, so destroying what may be valuable data records.

THE PRIOR ART

The evolution of the disc file has seen a progression from rigid, nonremovable discs, through rigid removable discs to the now widespread adoption of the flexible, removable disc employed either singly or in multiple layer disc packs.

There was never any centring problem with non removable rigid discs; being kept forever on the same machine, and never being removed, it was inevitable that the data storage tracks were centred on the centre of rotation of the disc.

The rigid, removable disc also enjoyed a degree of immunity from centring problems. The disc, usually housed in a cartridge pack, was pre-centred at its point of manufacture onto a precision mounting. When inserted into a disc drive, the precision mounting mated with a similarly precise hub assembly. While this added considerably to the cost, size and weight of the individual discs, the method enabled centring accuracies within a twenty-thousandth of an inch to be achieved. Transducer and positioner technology were such that the radial track density on the discs was limited at a level well below that at which eccentricity errors became significant. The rigid, removable disc was thus virtually free of disc centring problems.

Advances in polymer sheet and coating technology made possible the introduction of the flexible disc. This form of disc consisted of a circular laminar of a polymer such as mylar, a few thousandths of an inch thick, coated on one or both sides with magnetic material and housed in a jacket lending rigidity and protection to the disc, the transducer and disc rotating apparatus gaining access to the disc surface by way of windows, cut in the jacket material. The great attraction of the flexible disc lay in its low cost, small size and in the reduced cost of the disc drive required for its use. In addition, the extremely thin cross section of the disc, in its jacket, allowed for compact, economical storage of discs when not actually in use in a disc file.

The attractive features of the flexible disc, namely low cost and small size, were the very things that created a disc centring problem. There was no possibility of mounting the disc onto a precision mount, since size and cost would become unacceptable. The solution reached consisted of punching a spindle hole in the disc material which was concentric with the disc, and through which a hub and cone assembly, of moderate precision, protruded when the disc was in the disc file. These two parts, coming together in the disc drive, grasped and centred the disc, allowing for its rotation. The hub and cone assembly was usually manufactured from low cost, moulded plastic. The centring accuracy so achieved was at least a decimal order of magnitude worse than that achieved with rigid, removable discs. This did not matter too much, as the coating and transducer technology limited the radial track density, as did the mechanical properties of the disc, to a level at which such eccentricity was acceptable.

There has been, and always will be a trend towards higher data capacity on any memory system. Developments have occurred which allow for higher radial track densities on flexible discs. Transducer and positioner improvements, together with more advanced coating techniques, have forced the limit of track densities from a previous 48 to the radial inch towards 200 to the inch. There is no indication that this trend will stop.

Together with the improvements mentioned, a similar improvement has taken place in hub and cone technology. There are, however, mechanical restraints connected with the thin nature of the flexible disc material which have caused the disc centring to remain problematical. This is reflected as a statistical chance that a flexible disc, with acceptable centring hole, inserted into a disc drive, with acceptable hub and cone assembly, will still display an unacceptable amount of eccentricity. Upon reinsertion of the disc into the drive, this eccentricity disappears.

As mentioned earlier, it can be disastrous to the data on a disc if the disc is run with an unacceptably large amount of eccentricity. For this reason, it becomes desirable that the eccentricity of the disc be guaranteed to cause no harm.

Various schemes have been mooted whereby the transducer in a disc file may be caused to follow an eccentric data track and so negate the effects of eccentricity. All of these schemes have the disadvantage of cost and complexity.

Because of the statistical nature of the chance of an unacceptable centring of a disc in a disc file, it becomes a desirable aim to assess the amount of eccentricity present on an inserted disc. If the eccentricity proves too large, all that is required is that the operation of the disc file be inhibited until the operator has reinserted the disc in response to an indication given of the condition. This process may continue until a particular disc is adequately centred.

OBJECTIVES OF THE INVENTION

Accordingly, it is a prime objective of the present invention to provide a method and apparatus whereby the above objectives may be achieved.

It is a further objective of the present invention to provide a data storage file for the storage of retrievable, informational data in a plurality of concentric, data storage tracks on removable, rotating media which includes disc eccentricity assessing apparatus, where the eccentricity of media, introduced into the apparatus, is assessed, and if found to be unacceptably large, the operation of the data storage file is inhibited and indication of the condition is given to the operator.

A still further object of the present invention is to provide an apparatus for the assessment of disc eccentricity in a disc file, where the apparatus includes, firstly, servo information, recorded on the disc, the servo information being indicative of the desired centre of rotation of the disc, and secondly, within the disc file, a servo information decoding apparatus scrutinising the servo information and so examining the distance between the actual and the desired centres of rotation of the disc, inhibiting the operation of the disc file and indicating such to the operator should the distance be too great, necessitating a reintroduction of the disc to the disc file.

A final objective of the present invention is to provide a disc file, for use with removable media, wherein the possibility of damage to stored data or of low recovered data reliability caused by the presence of excessive error in the centring of the disc is eliminated by the avoidance of disc file operation under conditions where eccentricity is unacceptably large.

BRIEF DESCRIPTION OF THE INVENTION

In accordance with the present invention, there is provided a data storage file for the storage of retrievable, informational data in a plurality of concentric, data storage tracks on removable, rotary media having recorded on it a circular servo track whose centroid is coincident with the desired centre of rotation of the media, where there is provided, within the data storage file, a servo track locator which comprises a transducer and a servo decoder, the servo decoder having, as its input, signals recovered from the media by the transducer. The servo decoder first assesses and stores the mean position of the transducer on the media relative to the servo track, and secondly scrutinises the point by point excursion of the servo track relative to the mean position of the transducer first found. By examination of the peak excursions of the servo track, relative to the transducer mean position, the servo decoder assesses the distance between the actual and desired centres of rotation of the media. If this distance exceeds a predetermined limit, the servo decoder generates an output inhibiting the further operation of the data storage file, and activating an operator indicator, so signalling to the operator the discovered condition.

In the preferred embodiment of the present invention there is provided a magnetic disc file for the storage of retrievable, informational data on a plurality of concentric, data storage tracks on a removable, flexible disc. The flexible disc has, recorded on it, a circular, servo track whose centroid is coincident with the desired centre of rotation of the disc. The disc file is provided with a magnetic head which is radially mobile, over the media, with respect to the actual centre of rotation of the disc. In response to signals from a controller, a head positioner causes the head to take up position so as to be interactive with the disc about radii indicated to the head positioner by the controller. Signals, recovered from the disc by the head, are coupled as input to a servo signal decoder. The servo signal decoder has an output indicative of the direction of the displacement of the zone of interaction of the head with the disc relative to the servo track. The output of the servo signal decoder is coupled to the controller as an input.

The particular kind of servo track recorded on the disc, in the preferred embodiment of the present invention, is a tribit track. This kind of track has the property that, whenever the zone of interaction of the head with the disc is disposed over the tribit track, such that the median line of the track, which is circular and concentric with the desired centre of rotation of the disc, bisects the zone of interaction of the head on the disc, the signals derived from the disc may be interpreted as indicating a null position. This position of bisection is defined as the centrally interactive position. The servo signal decoder has an output indicative of which side of this median line the majority of the zone of interaction of the head lies at any particular instant.

The head employed in the preferred embodiment of the present invention is the normal reading and writing head of the disc file which is called upon to be part of the eccentricity estimation apparatus whenever a disc is inserted into the disc file.

Upon initial insertion, or reinsertion, of a disc into the disc file, the controller firstly issues signals to the head positioner causing the zone of interaction of the head with the disc to take up a radial position on the disc at which the head becomes interactive with the servo track.

Secondly, by examining the output of the servo signal decoder, the controller issues further signals to the head positioner which cause the zone of interaction of the head iteratively to approach the centrally interactive position as averaged around the entire servo track. The output of the servo signal decoder is sampled, at regularly spaced points, around the whole of the servo track, and the direction of the offset of the zone of interaction of the head with the disc from the median line of the servo track is taken as that direction for which most samples are obtained. If the result of sampling indicates an offset, more often towards the centre of rotation that it is away from the centre of rotation, then it is deemed that the head is too far towards the centre of rotation, and vice versa. By issuing signals to the head positioner whereby the zone of interaction of the head is moved in the appropriate direction in increasingly smaller steps, and by sampling the entire servo track after each head movement, the centrally interactive position is iteratively approached, being indicated by the head position where the regularly sampled output of the servo signal decoder is as often indicative of the head being too close to the centre of rotation as it is too far away from the centre of rotation.

Thirdly, the controller issues still further signals to the head positioner which cause the zone of interaction of the head to be moved a radial distance, away from the centrally interactive position, equal to the maximum acceptable distance between the desired and actual centres of rotation of the disc.

Finally, the controller examines the new nature of the output of the servo signal decoder. If this output indicates that the zone of interaction of the head is, at all points around the servo track, on one side only of the median line of the servo track, then the disc is deemed to be adequately centred, and normal operation of the disc file is not inhibited. If, however, at any point around the servo track, the zone of interaction of the head crosses the point where it is bisected by the median line of the servo track, indicating that the separation between the desired and actual centres of rotation of the disc is less than the distance last moved by the head, then it is deemed that the disc has unacceptably large eccentricity. In this circumstance, the controller autonomously inhibits the further operation of the disc file, and also sends an output to the host computer whereby the host is caused to print a message, to the operator, indicating that the disc must be reinserted into the disc file before further operation may proceed. The novel features which are considered characteristic of this invention are set forth with particularity in the appended claims.

The invention itself, both as to its organisation and method of operation, as well as additional objects and advantages thereof, will best be understood from the following description when read in connection with the accompanying drawings.

BRIEF DESCRIPTION OF THE DRAWINGS

FIGS. 2A and 2B show the nature of the servo track.

FIGS. 3A/1 to 3C/2 show the behavior of the servo signal decoder for different head positions relative to the servo track.

FIG. 4 shows the block diagram of the servo signal decoder of the preferred embodiment of the present invention.

DESCRIPTION OF THE PREFERRED EMBODIMENT

Detailed Description of the First Figure

Figure 1:
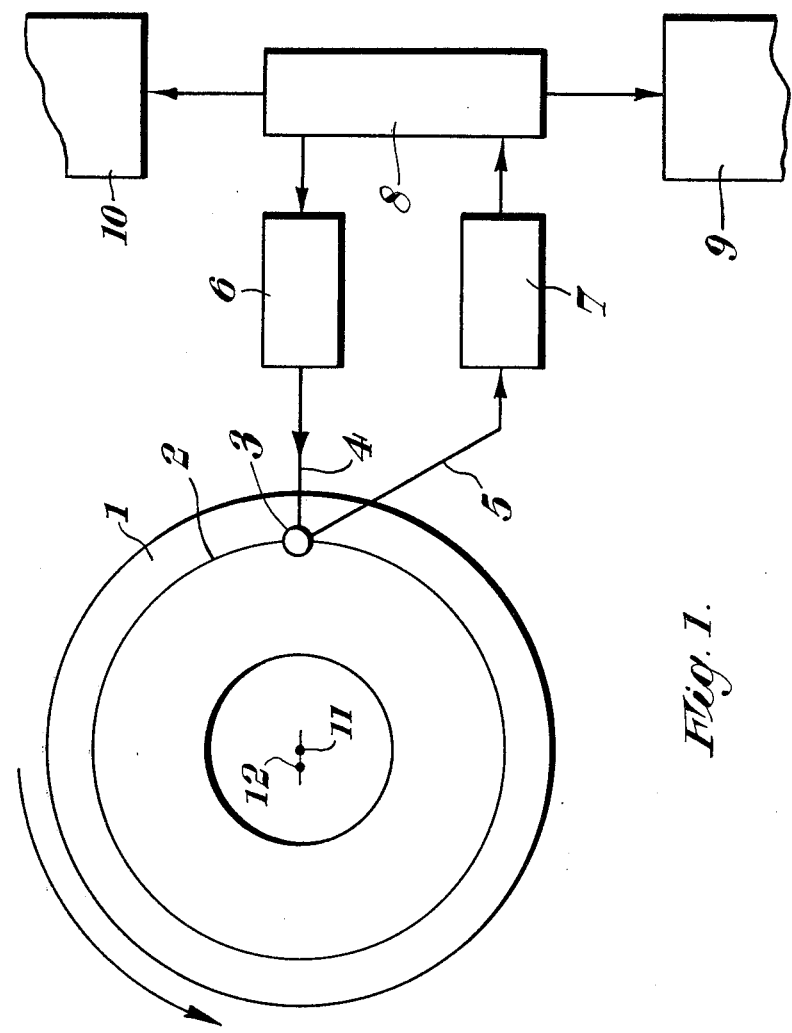
FIG. 1 shows the system of the preferred embodiment of the present invention.

Attention is first drawn to FIG. 1 which shows the system of the preferred embodiment of the present invention, provided additionally to the apparatus comprising a data storage disc file.

A flexible, removable disc (1) on which data is retrievably stored in a plurality of concentric, data storage tracks, is located within a disc file and caused to rotate about a first centre (12) by conventional means not indicated in FIG. 1.

There is provided, on the disc (1), a circular servo track (2) whose centroid (11) is coincident with the desired centre of rotation (11) of the disc (1).

A head (3) is disposed adjacent to the surface of the disc (1) and interacts with the area of the disc (1) to which it is immediately adjacent for the recovery of signals therefrom. The head (3) is positioned, relative to the disc (1), along a radial line, from the centre of rotation (12) of the disc (1) by a head positioner (6).

The head (3) is mechanically coupled to the head positioner (6) via the head mechanical coupling (4). The head positioner (6) is provided with an input responsively coupled to a first output of the controller (8), the controller (8) indicating to the head positioner (6) at what radius on the disc (1), relative to the centre of rotation (12) of the disc (1), it is required that the head (3) should recover signals, and the head positioner (6) complying with this indication by placing the head (3) over the indicated radius.

The signals recovered from the disc (1) by the head (3) are coupled, as an input, to the servo signal decoder (7) via the head signal connector (5). The output of the servo signal decoder (7), indicative of which side of the servo track (2) the majority of the area of interaction of the head (3) with the disc (1) is radially disposed, is coupled as an input to the controller (8).

The controller (8) is provided with a second output which is coupled as an inhibiting input to the disc file operating system (10), the disc file operating system (10) performing the normal data transfer and housekeeping functions associated with the normal operation of a disc file.

The Controller (8) is also provided with a third output coupled as an indicating input to the host system utilising the disc file as a peripheral memory.

The head (3) of the preferred embodiment is not in fact a component additional to the usual component parts of a moving head disc file, but is commonly available to the disc file operating system which uses it at other times for normal data deposition and recovery operations on the disc (1). The head positioner (6) is likewise commonly available to the disc file operating system (10), and is employed in other circumstances as the main disc file head positioner being responsive to the disc file operating system (10) and locating the head (3) over those particular concentric, circular, data storage tracks on the disc (1) where it is required to perform a data transfer operation.

Detailed Description of the Servo Track (2)

Attention is next drawn to FIGS. 2A and 2B which together show the detailed magnetic structure of the servo track (2).

The servo track (2) is a "Tribit" servo track first taught by Meuller in U.S. Pat. No. 3,691,543 of Sept. 12, 1972.

The disposition of the component parts of the servo track (2) is shown in FIG. 2A. The disc (1), here shown in cutaway outline, bears the circular servo track (2) which consists of two concentric, circular sub-tracks (13 & 14). The outer sub-track (13) is totally contiguous with the inner subtrack (14) along a circular, central line (15) which is itself concentric with the two sub-tracks (13 & 14).

The pattern of the magnetisation of the servo track (2) is shown in detail in FIG. 2B. A repeating tribit pattern (16) is laid down on the disc (1) by magnetic saturation recording around the whole of the servo track (2). Each pattern (16) consists of two pairs of oppositely polarised zones, one on each subtrack, repeated along each of the sub-tracks. The areas of magnetisation marked A are recorded with the opposite magnetic polarity to those marked B. The B to A transitions (21), on the outer sub-track (13) are arranged to be spacially coincident with the B to A transitions (21) on the inner sub-track (14) around the whole of the servo track (2). The A to B transitions (22) are spatially staggered between the sub-tracks (13 & 14).

The signals, recovered from the servo track (2) by the head (3) are indicated in FIG. 3. Each B to A transition (21), as it passes the head (3), causes a positive pulse to appear at the output of the head. Each A to B transition (22), in passing the head, causes a negative pulse to appear at the output of the head (3). The amplitude or size of each pulse is linearly dependent on the proportion of the radial width of the head gap (17) straddled by the transition causing the pulse. The head gap (17) is the active portion of the head (3), being a long narrow slit in the magnetic circuit of the head situated at the base of the head and intercepting magnetic flux from the surface of the disc (1) for transference through the ferromagnetic core of the head to flux-sensing coils. Each tribit pattern (16) is thus seen, at the output of the head (3), as a series of three peaks, firstly a positive, timing peak (18), secondly, a negative, first position peak (19), and thirdly, a negative, second position peak (20).

FIG. 3A/1 shows the condition where the head gap (17) is symmetrically disposed about the centre line (15) of the servo track (2). The positive timing peak (18) of the head (3) output signal under these conditions, is twice the amplitude of each of the two position peaks (19 & 20), since the B to A transition (21) causing the timing peak (18) straddles the entire head gap (17), but each of the A to B transitions (22) straddles only half of the head gap (17). The two position peaks (19 & 20) are equal in amplitude since the head gap (17) intercepts the same amount of magnetic flux from the inner sub-track (14) as it does from the outer sub-track (13).

FIG. 3B/1 shows the condition prevailing when the head gap (17) is disposed more over the outer sub-track (13) than it is over the inner sub-track (14). The head output signal is shown in FIG. 3B/2. The timing peak (18) has the same amplitude as before since the B to A transition (21) causing the timing peak (18) still straddles the entire head gap (17). The first position peak (19), caused by the A to B transition (22) on the outer sub-track (13), is of greater amplitude then the second position peak (20) caused by the A to B transition (22) on the inner sub-track (14) since the head gap (17) intercepts more magnetic flux from the outer sub-track (13) than it does from the inner sub-track (14)

FIG. 3C/1 shows the condition prevailing when the head gap (17) is disposed more over the inner sub-track (14) than over the outer sub-track. The output signal of the head (3) is shown in FIG. 3C/2. The timing peak (18) is still the same size as before since the B to A transition (21) causing it, still straddles the entire head gap (17). The second position peak (20) is of greater size than the first position peak (19) since the head gap (17) intercepts more magnetic flux from the inner sub-track than it does from the outer sub-track.

The head (3) is deemed to be centrally disposed over the servo track (2) whenever the head gap (17) is symmetrical about the central line (15). Under these conditions, the amplitude of the first position peak (19) equals the amplitude of the second position peak (20).

OPERATION OF THE SERVO SIGNAL DECODER (7)

Attention is drawn to FIG. 4 which shows the block diagram of the servo signal decoder (7) employed in the preferred embodiment of the present invention.

The servo signal decoder (7) is a simple direction sensing device which gives a true output if the signals, recovered from the disc (1) by the head (3), and forming the input to the servo signal decoder (7), are indicative of the head gap (17) being disposed over the outer sub-track (13) than over the inner sub-track (14) and a false output if the signals are indicative of the head gap (17) being disposed more over the inner sub-track (14) than over the outer sub-track (13).

The direction sensing action is achieved by the separation of the two position peaks (19 & 20) in the recovered signals and the comparison of their amplitudes.

In order to separate the two position peaks, the timing peaks (18) in the recovered signals are detected by a timing peak detector (23) whose output consists of a single short pulse coincident with the presence of every timing peak in the recovered signals which form its input. The output of the timing peak detector (23) is coupled, as a triggering input, to a monostable window generator (24). When triggered, the window generator (24) presents, to its output, a timing window, whose duration spans the time between the timing peak (18) to midway between the two position peaks (19 & 20). The output of the window generator (24) is coupled to the controlling input of an analog gate (25). The analog gate (25) has, as its controlled input, signals recovered from the disc (1) by the head (3). When the controlling input of the analog gate (25) is true, the controlled input is directed into a first output (28), and when false, the controlled input is directed into a second output (29). Thus the output of the analog gate (25) consists of one position peak directed down a first connector (28) and the other position peak down a second connector (29). The two position peaks, separated by the action of the window generator (24) on the analog gate (25), are thus made separately available for amplitude comparison.

The two position peaks (19 & 20), thus separated, are individually applied as inputs to two separate sample-and-hold networks (26 & 27) whose operation is to provide as an output the retained value of the amplitude of the last peak applied to its input. The outputs of the sample-and-hold networks (26 & 27) are individually coupled as inputs to a voltage magnitude comparator (30) where they are compared in magnitude to generate, as the output of the comparator (30), the overall output of the servo signal decoder (7).

OPERATION OF THE HEAD POSITIONER (6)

The head positioner (6), of the preferred embodiment, is a linear, recursive, position controlling servo which possesses a plurality of rest positions for the head (3) across the surface of the disc (1) in the radial direction of the centre of rotation (12) of the disc (1). One out of the plurality of the rest positions, places the head (3) in the vicinity of the servo track (2). The radial excursion of the head (3) over the surface of the disc (1), from each rest position, with respect to the centre of rotation (12) of the disc (1), is a linear function of the magnitude and sense of the input to the head positioner (6). Thus equal increments of the input to the head positioner (6) produce equal radial positional changes of the head (3) on the disc (1). Similarly, a scaled increment of the input signal to the head positioner (6) produces an equally scaled radial movement of the head (3) over the disc (1). The maximum available excursion of the head (3) from each rest position, is deliberately limited by the placing of a maximum upper limit on the magnitude of the input. In this way the head (3) may not stray from the band of radii on the disc (1) properly associated with one rest position into the band of an adjacent rest position. The servo track (2) is thus safeguarded from accidentally being overwritten during normal operation of the disc file.

FIRST SAMPLING ACTION OF THE CONTROLLER (8)

The controller (8) has, as a scrutinised input, to which it is responsive, the output of the servo signal decoder (7). This output reflects, by means of a true or false logic signal, the instantaneous direction of displacement of the head gap (17) away from the position of symmetrical disposition over the centre line (15) of the servo track (2).

In order to establish the mean radial displacement direction of the head (3) away from the centrally disposed position above the radially oscillating servo track (2), the controller (8) performs an averaging operation on the output of the servo signal decoder (7).

There are provided, within the controller, (8) two registers, a true register and a false register. At the commencement of an averaged sample operation, the binary number stored in each register is reset to zero. The controller (8) next samples its input at one millisecond intervals for the total number of milliseconds required for the disc (1) to execute one complete revolution. Every time the input is found to be true, the number stored in the true register is increased by one, and every time the input is found to be false, the number stored in the false register is increased by one. At the end of the sampling period, lasting for one disc revolution, the numbers in the two registers are compared with one another for magnitude. If the number in the false register is greater than the number in the true register, the input is deemed to have been predominantly false, and vice versa. The predominant result is taken as the mean direction of the offset direction of the head (3) from the centrally disposed position over the servo track (2).

In this manner, the controller (8) constructs an averaged sample of the output of the servo signal decoder (7) indicative of the mean direction of displacement of the head (3) away from being centrally disposed above the servo track (2).

SECOND SAMPLING ACTION OF THE CONTROLLER

The controller (8) also performs a second sampling action. In this second sampling action, the output of the servo signal decoder (7) is examined, as before, around one complete revolution of the disc, to establish whether or not it changes at any point on the servo track.

The true and false registers are treated as before. At the end of the sampling period, the contents of the registers are examined. If it is found that the contents of either of the registers is zero, and the contents of the other register is non-zero, the second sampling operation is deemed to have been successful. If however, the contents of neither register is zero, the second sampling operation is deemed to have failed.

In this way, the controller (8) establishes whether or not the head (3) has remained exclusively to one side of the centrally disposed position over the servo track (2) during a complete revolution of the disc (1).

ITERATIVE LOCATION OF THE MEAN, CENTRALLY DISPOSED POSITION

With the head positioner (6) locating the head (3) around that servo rest position which is in the vicinity of the servo track (2), the controller (8) applies a zero input to the head positioner (6). The controller (8) next performs a first sampling operation. By examining the result of this operation, the controller (8) decides the sense of the input which must be applied to the head positioner (6) in order to bring the head (3) towards the centrally disposed position over the servo track (2). A large, predetermined input, of the appropriate sense, is then applied to the head positioner (6) by the controller (8). The first sampling operation is repeated by the controller (8) and the new direction of change to the input of the head positioner (6) which is required to bring the head (3) towards the centrally disposed position over the servo track (2), is decided. If the head (3) has moved beyond the centrally disposed position with its last movement, as indicated by a change in the result of the first sampling operation, an increment of input to the head positioner, equal in magnitude to half of the former increment, is subtracted from the former input to the head positioner (6). If the head (3) has not moved beyond the centrally disposed position, indicated by the result of the first sampling operation remaining the same, the new increment is added to the last value of input to the head positioner (6). This process is cyclically repeated each time reducing by half the value of the new increment, until the size of the increments has become sufficiently small for the centrally disposed position of the head (3), over the servo track (2), to have been located with adequate precision.

In this way, the controller (8), working co-operatively with the servo signal decoder (7) and the head positioner (6), causes the head (3) to assume the centrally disposed position over the servo track (2) by way of a binary chop, iterative process.

HEAD DISPLACEMENT FROM THE CENTRALLY DISPOSED POSITION

The controller (8) causes the head (3) to be displaced from its centrally disposed position, over the servo track (2), by a known radial distance, prior to the controller performing a second sampling operation on the output of the servo signal decoder (7).

The input to the head positioner (6), which was resultant from the iterative location of the centrally disposed position of the head (3) over the servo track (2), has added to it an increment of input which is known to cause the head (3) to move a radial distance equal to the maximum permissible separation between the actual centre of rotation (12) of the disc (1) and the desired centre of rotation (11) of the disc (1). The result of this addition is applied as the new input to the head positioner.

OVERALL OPERATION OF THE SYSTEM

With regard to the definitions of the various operations given above, the overall operation of the preferred embodiment of the present invention is as follows.

On the insertion, or reinsertion of a disc (1) into the disc file, the disc file operating system (10) causes the head (3) to be positioned in the servo rest position which is in the vicinity of the servo track (2).

The controller performs an iterative location of the centrally disposed position of the head (3) over the servo track (2).

The controller (8) next displaces the head (3) from the centrally disposed position.

Finally, the controller performs a second kind of sampling action on the output of the servo signal decoder (5).

A successful result to the sampling action is indicative of the sinusoidal, radial excursion of the servo track (2) beneath the head at its centrally disposed position having an amplitude less than the distance moved by the head when the head (3) was displaced from that position. Since the amplitude of the sinusiodal movement of the servo track (2) beneath the head (3) is equal to the absolute distance between the actual centre of rotation (12) and the desired centre of rotation (11) of the disc (1), the desired centre of rotation being the centroid of the servo track (2), the successful result indicates that the eccentricity of the disc centring lies within an acceptable limit. In this circumstance, the controller (8) generates no further output, and operation of the disc file proceeds unhindered.

An unsuccessful result to the sampling action is indicative of the presence of unacceptably large eccentricity in the disc centring. Under these circumstances, the controller (8) generates a first, inhibiting output to the disc file operating system (10) stopping any further action in the disc file, and a second, indicating output to the host computer (9) whereby the host computer (9) is caused to print a message for the attention of the operator indicative of the necessity of a reintroduction of the disc (1) into the disc file before operation may proceed.

OTHER IMPLEMENTATIONS OF THE INVENTION

It will be apparent, to those skilled in the art, that the indicating output of the controller (8), taken to the host computer (9) in the preferred embodiment, might equally well be caused to activate an aural or visual warning device to attract the operator's attention to the presence of excessive error in the disc centring.

It will also be apparent, to those skilled in the art, that in order to prevent catastrophic data loss from the disc (1), the operation of the disc file need not be totally inhibited by the controller (8), it being sufficient that the data deposition process alone be prevented so that no data can be written onto the disc at a radially erroneous location.

It will also be apparent, to those skilled in the art, that the servo track (2), recorded on the disc (1), need not in particular be a tribit track, but may be any one of a variety of different kinds of servo tracks, for use with an appropriate servo track decoder.

It will also be apparent, to those skilled in the art, that the head (3) employed in the present invention, may be a dedicated head, which is exclusively reserved for the task of eccentricity estimation.

It will also be apparent, to those skilled in the art, that averaging processes, other than that used in the preferred embodiment, may equally well be employed for the estimation of the direction of the head (3) from the centre line (15) of the servo track (2).

It will also be apparent, to those skilled in the art, that, by the use of a different style of servo track decoder, giving, as its output, an indication of the distance as well as the direction between the actual position of the head (3) and its centrally disposed position over the servo track, it is possible to perform the same eccentricity estimation operation without head movement, by examining the mean and instantaneous values of that distance.

What I claim is:

1. Apparatus for measuring the eccentricity between a desired operating position of a removable disc and a disc file and the actual position in which the disc has been filed wherein the removable disc has a plurality of concentric data storage tracks, comprising:
- a first part associated with said removable disc for providing information with respect to the distance between the actual center of rotation of said removable disc and the centroid of said concentric data tracks, said first part including a circular servo track on said removable disc, said circular servo track including a circular null line which has the same centroid as said concentric data tracks, said circular servo track providing servo track signals which contain information indicative of the radial distance between the site where the signal is picked up and the position where said pick up site would by symmetrically disposed about said circular null line; and,
- a second part integral with said apparatus for receiving said distance indicating information from said first part and for providing an output indicative of whether said distance indicated by said distance indicating information exceeds a predetermined distance, said second part including (a) transducing means for recovering signals from said removable disc, (b) servo track decoding means for decoding said servo track signals and for providing an output indicative of the radial distance between the zone of interaction on said removable disc of said transducing means and the position where said zone of interaction would be symmetrically disposed about said circular null line and (c) interpreter means for computing the distance between the means value and the actual value of said radial distance and for providing an output indicative of whether said difference exceeds a predetermined limit.

2. Apparatus according to claim 1 wherein said output of said interpreter means is coupled to an indicating means, said indicating means providing a warning to an operator if said output of said servo track decoding means indicates a change in the direction of said radial displacement.

3. Apparatus according to claims 1 or 2 wherein said output of said interpreter means is also coupled to an inhibiting means, said inhibiting means for preventing data transfer operations on said removable disc in said disc file if said output of said servo decoding means indicates a change in the direction of said radial displacement.

4. Apparatus according to claim 3 wherein said removable disc is a magnetic disc and said transducing means is a magnetic head.

5. Apparatus for measuring the eccentricity between a desired operating position of a removable disc and a disc file and the actual position in which the disc has been filed wherein the removable disc has a plurality of concentric data storage tracks comprising:
- a first part associated with said removable disc for providing information with respect to the distance between the actual center of rotation of said removable disc and the centroid of said concentric data tracks, said first part including a circular servo track on said removable disc, said circular servo track including a circular null line which has the same centroid as said concentric data tracks, said circular servo track providing servo track signals which contain information indicative of the radial distance between the site where the signal is picked up and the position where said pick up site would be symmetrically disposed about said circular null line; and,
- a second part integral with said apparatus for receiving said distance-indicating information from said first part and for providing an output indicative of whether said distance indicated by said distance-indicating information exceeds a predetermined distance, said second part including (a) transducing means for recovering signals from said removable disc, (b) transducer positioning means for positioning said transducing means with respect to said removable disc, (c) servo track decoder means for decoding said servo track signals and for providing an output indicative of the direction of radial displacement of the zone of interaction on said removable disc of said transducing means from the position where said zone of interaction would be symmetrically disposed about said circular null line and (d) controller means responsive to said output of said servo track decoder means for supplying first signals to command said transducer positioning means to move said transducing means to a point where said zone of interaction is symmetrically disposed about said null line, for supplying second signals to command said transducer means to a point where said zone of interaction is a predetermined radial distance away from said symmetrically disposed point about said null line, and for providing an output which indicates whether said output of said servo track decoder means changes its sense of direction at any point around said circular servo track.

6. Apparatus according to claim 5 wherein said output of said controller means is coupled to an indicating means, said indicating means providing a warning to an operator if said output of said servo track decoding means indicates a change in the direction of said radial displacement.

7. Apparatus according to claim 5 or 6 wherein said output of said controller means is also coupled to an inhibiting means, said inhibiting means for preventing data transfer operations on said removable disc in said disc file if said output of said servo decoding means indicates a change in the direction of said radial displacement.

8. Apparatus according to claim 7 wherein said removable disc is a magnetic disc and said transducing means is a magnetic head.

* * * * *